P. F. MORRISSY, J. WISE & W. A. BYRNE.
TROLLEY WHEEL.
APPLICATION FILED OCT. 17, 1908.

968,876.

Patented Aug. 30, 1910.

Witnesses

Inventors
P. F. Morrissy,
J. Wise,
W. A. Byrne,
By John H. Byrne
Attorney

UNITED STATES PATENT OFFICE.

PATRICK F. MORRISSY, JAMES WISE, AND WALTER A. BYRNE, OF AUBURN, NEW YORK, ASSIGNORS OF ONE-FOURTH TO JOHN E. COUGHLIN, OF AUBURN, NEW YORK.

TROLLEY-WHEEL.

968,876.     Specification of Letters Patent.      Patented Aug. 30, 1910.

Application filed October 17, 1908. Serial No. 458,232.

*To all whom it may concern:*

Be it known that we, PATRICK F. MORRISSY, JAMES WISE, and WALTER A. BYRNE, citizens of the United States, residing at Auburn, in the county of Cayuga and State of New York, have invented certain new and useful Improvements in Trolley-Wheels, of which the following is a specification.

The invention relates generally to improvements in trolley wheels, being more particularly directed to a construction of trolley wheel whereby the active life of the same may be doubled.

One of the objects of the present invention is the provision of a trolley wheel made up of independent duplicate sections, the peripheral surface of each section being formed to provide duplicate wire engaging surfaces, each surface constituting one-half of the wire groove of the complete wheel, whereby the sections may be connected to utilize either of their respective wire engaging surfaces to form the wire groove.

The invention will be described in the following specification, reference being had particularly to the accompanying drawings, in which:—

Figure 1:
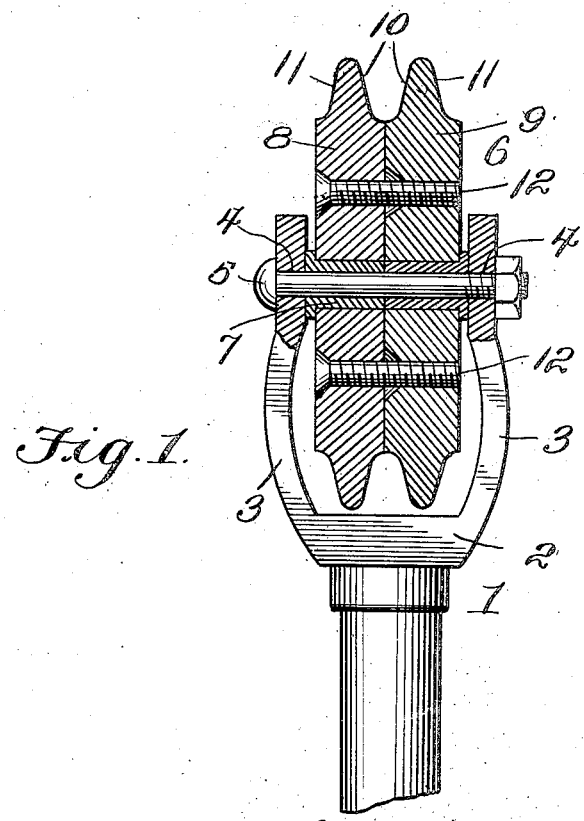
Figure 2:
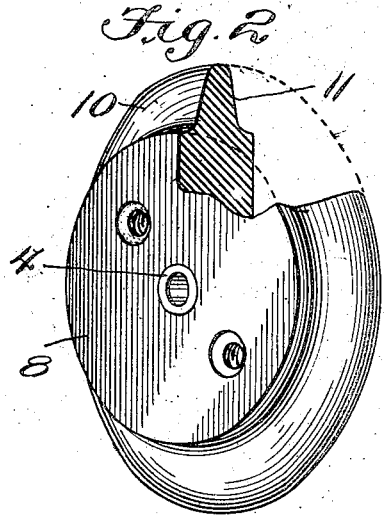

Figure 1 is a sectional view taken on a plane extending vertically through a trolley wheel constructed in accordance with our invention, and Fig. 2 is a detail perspective view of one of the sections of the trolley wheel.

Referring particularly to the accompanying drawings, wherein is shown the preferred details of the present invention, 1 represents a trolley harp from the head plate 2 of which projects, in diametrically opposed relation harp arms 3. The arms 3, which are of an appropriate length, are formed at their upper or terminal ends with bearings 4 to receive the shaft 5 of a trolley wheel 6, the wheel, as is usual in such constructions, being centrally cored to receive a bushing 7 to bear upon the shaft 5.

The wheel 6 is of specific construction, in that it is made up of duplicate independent sections 8 and 9. The peripheral portion of each section is formed on opposing sides of the central circumferential line with wire engaging surfaces 10 and 11, each of which is of such shape as to constitute one-half of the wire receiving groove of the wheel. The sections are adapted to be secured in wheel-forming position by a series of bolts 12, appropriately secured in place to avoid projection, the use of the bolts securing the sections so as to arrange their adjacent wire engaging surfaces to form a trolley wire groove centrally of the wheel.

It will be understood that if desired the bolts 12 may be dispensed with without interfering in any degree with the proper function of the sections, as the bushing 7 operates to hold the sections in contact, and their freedom for independent movement when the bolts are not used does not interfere in any degree with their function or result. As each section 8 and 9 has duplicate opposing wire engaging surfaces 10 and 11, it is obvious said sections may be secured together to arrange their surfaces 10 to form the groove, or to arrange their surfaces 11 in groove-forming position. It is at once obvious, therefore, that with the wire engaging surfaces, as 10, rendered imperfect by use, a reversal of the sections to arrange their surfaces 11 in groove-forming position, will provide a new and perfect groove. The life of the trolley wheel is thus doubled, without requiring the removal or addition of any parts.

Having thus described the invention what is claimed as new, is:—

1. A trolley wheel comprising sections each having its peripheral edge shaped to provide a plurality of independent wire engaging surfaces, any two of the wire engaging surfaces forming a wire receiving groove when the sections are assembled in wheel forming position, and means securing the sections in wheel forming position against relative movements.

2. A trolley wheel comprising sections each having its peripheral edge shaped to provide a plurality of spaced and oppositely extending wire engaging surfaces, any two of the wire engaging surfaces forming a wire receiving groove when the sections are assembled in wheel forming position, and means securing the sections in wheel forming position against relative movements.

3. A trolley wheel comprising sections each formed on opposite sides of its central circumferential line with wire engaging surfaces, any two of the wire engaging surfaces forming a wire receiving groove when the sections are assembled in wheel forming position.

4. A trolley wheel comprising sections each having wire engaging surfaces any two of which are adapted to form a wire receiving groove when the sections are assembled in wheel forming position.

In testimony whereof we affix our signatures, in presence of two witnesses.

PATRICK F. MORRISSY.
JAMES WISE.
WALTER A. BYRNE.

Witnesses:
JOHN RENAHAN,
JOSEPH D. COUGHLIN.